Nov. 6, 1962 H. W. BERGMANN 3,062,397
STABILIZATION MEANS FOR TANK MOUNTING
Filed March 16, 1961 3 Sheets-Sheet 1

INVENTOR.
Heinrich W. Bergmann
BY Ooms, McDougall,
Williams & Hersh
Attys

INVENTOR.
Heinrich W. Bergmann

Nov. 6, 1962  H. W. BERGMANN  3,062,397
STABILIZATION MEANS FOR TANK MOUNTING
Filed March 16, 1961  3 Sheets-Sheet 3
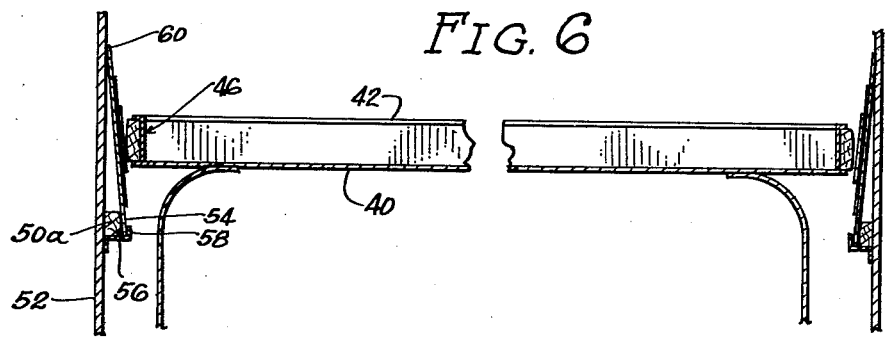
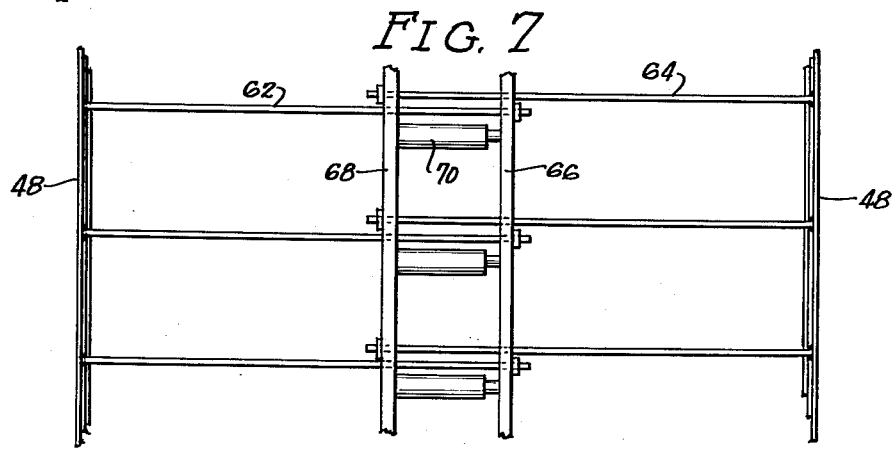
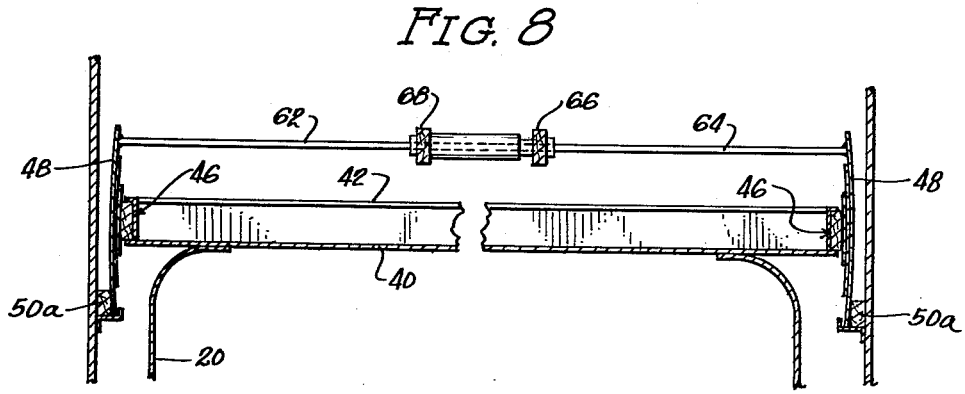
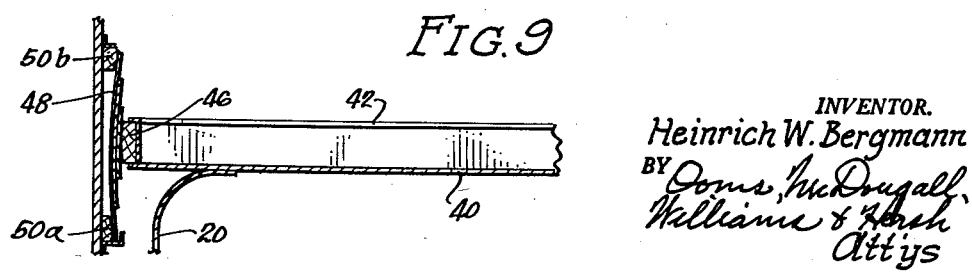
INVENTOR.
Heinrich W. Bergmann
BY
Att'ys

United States Patent Office 3,062,397
Patented Nov. 6, 1962

3,062,397
STABILIZATION MEANS FOR TANK MOUNTING
Heinrich W. Bergmann, Norman, Okla., assignor to Conch International Methane Limited, Nassau, Bahamas, a corporation of the Bahamas
Filed Mar. 16, 1961, Ser. No. 96,231
7 Claims. (Cl. 220—15)

This invention relates to the storage and transportation of liquid having a temperature differing widely from ambient temperature and it relates more particularly to the over-water transportation of a low boiling liquefied gas, such as liquefied natural gas.

The invention will be described with reference to the storage of large volumes of gas in a liquefied state for ship or over-water transportation of the natural gas from a source of plentiful supply to an area where a deficiency exists. It will be understood that the concepts of this invention will have application also to the storage and transportation of other low boiling liquefied gases or liquids maintained at an extremely cold temperature and that the concepts of this invention are applicable also to other means of transportation in which the storage container might be subject to rocking, rolling or pitching movements, in addition to the expansions and contractions due to temperature change.

For the storage and transportation of the gas in large quantities, it is desirable, from the standpoint of space utilization, to reduce the gas to a liquefied state whereby it is reduced about 600-fold in volume. It is also desirable to house the liquefied gas in containers of large capacity with the result that it becomes impractical to consider storage under pressure conditions departing widely from atmospheric pressure. Under such circumstances, the liquefied gas will be maintained in the storage container at about atmospheric pressure, which, for liquefied natural gas composed mostly of methane, will mean storage at a temperature of about —248° F. to about —258° F., depending upon the amount of higher molecular weight hydrocarbons present in the liquefied natural gas.

There are a number of extremely important problems presented in the storage and transportation of such extremely cold liquid in large volume. For one thing, it is desirable to surround the liquid storage tank or container with an effective amount of thermal insulating material not only to minimize loss of cargo by vaporization due to heat loss into the liquid from the surrounding atmosphere, but it is also desirable to protect the steel hull and structure of the ship or other transportation means from the cold of the liquid, otherwise the ship will be subject to destruction since the steels of which such ships are constructed begin to lose their strength and ductility at low temperatures and cracking can be experienced upon reduction of the steel to a temperature below —100° F.

For another thing, the storage tank is exposed to extremely wide temperature change in use which, in the storage and transportation of liquefied natural gas, may range from about +100° F., during installation or when the tank is empty, to a temperature of about —258° F., when the tank is filled with liquid cargo. When, as in the usual practice, the tanks are fabricated of a cold-resistant metal, such as aluminum or alloys of aluminum, stainless or the like high nickel steels, copper, brass, etc., a rather wide change in dimension of the tank will take place by reasons of expansions and contractions due to temperature change. In a storage tank with a length of 100 feet, a change of 3 or more inches in any direction can occur. As a result, the tanks cannot be rigidly tied into a ship structure which is not equally subjected to the same change in dimension. Instead, it becomes necessary to support the tank within the thermally insulating space in a manner which will enable the tank freely to expand and contract relative to the ship structure. On the other hand, it is undesirable to allow the tank to move from a stabilized position, for example, in response to the pitching and rolling movements of the ship, otherwise uncontrolled forces will be developed which might lead to the development of undesirable and dangerous conditions.

It is an object of this invention to provide a means for top stabilization of a tank of large capacity without rigid attachment to the supporting structure thereby permitting relative movement between the tank and its supporting structure in response to expansion and contraction forces but without movement of the tank with reference to its stabilized position.

Another object is to provide a means for mounting a tank of large capacity within the hold space of a ship in a manner in which the tank is free for relative movements due to expansion and contraction but in which the upper portion of the tank is maintained in a stabilized position notwithstanding the pitching and rolling movements of the ship and changes in the dimension of the tank due to expansions or contractions in response to temperature change.

These and other objects and advantages of this invention will hereinafter appear and for purposes of illustration, but not of limitation, an embodiment of the invention is shown in the accompanying drawings, in which—

FIG. 6 is a schematic sectional elevational view showing the elements of the top stabilization means in an intermediate stage of assembly;

FIG. 7 is a top plan view of the arrangement of elements employed for completing the assembly of the stabilization means;

FIG. 8 is an elevational view partially in section of the elements shown in FIG. 7; and FIGURE 9 is a sectional elevational view showing the stabilization means in its final assembly.

Figure 1:
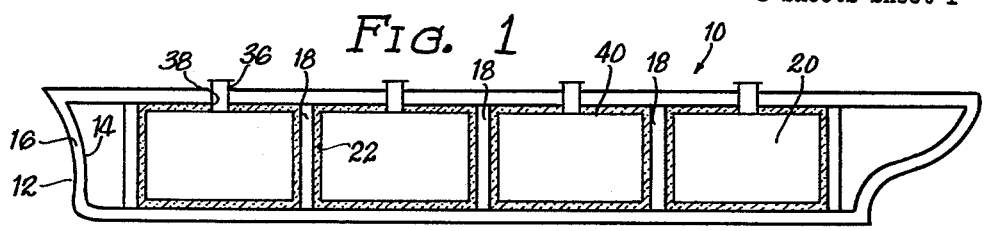
FIG. 1 is a schematic sectional elevational view of a transportation means illustrated as a ship in which a number of storage tanks of large capacity are mounted in accordance with the practice of this invention.
Figure 2:
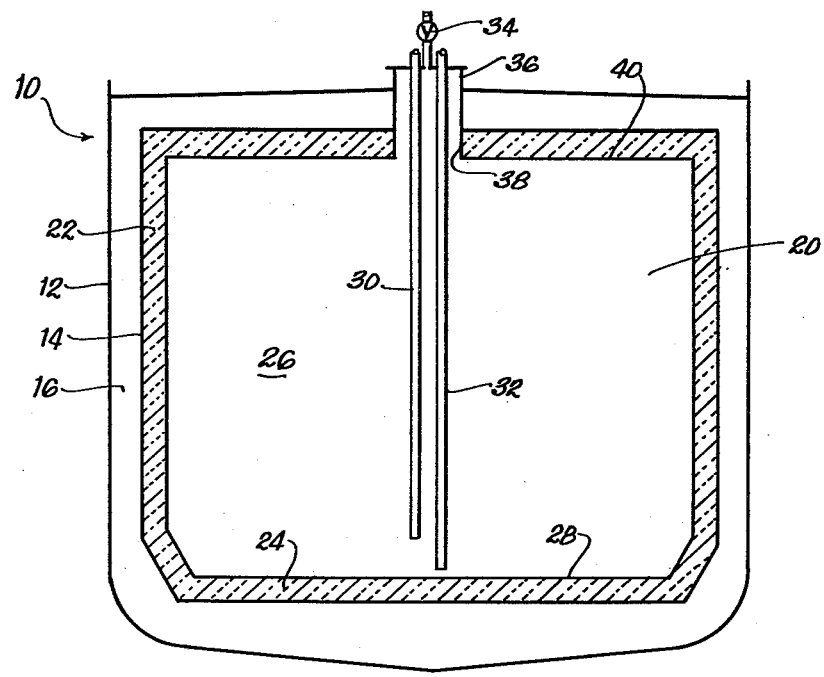
FIG. 2 is a cross-sectional elevational view taken along the line 2—2 of FIG. 1.

Referring now to the drawings, the numeral 10 represents a ship having a hull structure including an outer steel hull 12 and an inner steel hull 14 spaced inwardly a short distance from the outer hull and periodically interconnected therewith by means of girders to define sealed spaces in between, which may function as wing tanks 16 for ballast of the ship or through which water may be circulated for temperature control of the walls forming the inner hull and to protect the outer hull from the cold to which the inner hull might be exposed. The described double hull construction represents a preferred construction but the use of a double hull is not essential to the practice of this invention, and therefore, reference to the hull structure, as hereinafter employed, will include both a single hull as well as a double hull of the type described.

Cofferdams 18, which extend crosswise of the ship between the hull structure, operate to subdivide the hold space of the ship into a plurality of longitudinally spaced separated compartments 20. A relatively thick layer 22 of thermal insulating material is applied as a lining to the side walls of the compartments and as a flooring 24 to insulate the hold space. Mounted within the insulated hold space are one or more tanks 26 of large capacity for housing the liquefied natural gas or other cargo material having a temperature differing widely from the ambient temperature. Such storage tanks may be of rectangular shape for fuller utilization of the space available in the insulated hold of the ship; however, they may be of other configurations in cross-section but it is preferred to make use of a tank having a relatively flat bottom wall 28 so that the bottom wall can rest on the insulated flooring 24 for support. As previously pointed out, the tanks of this invention are tanks having sufficient wall thickness and strength for self-sufficiency under load and they are preferably formed of a temperature-insensitive material which does not experience excessive loss in strength or ductility when reduced to low temperature, such for example as when the tanks are formed of such metals as aluminum or alloys of aluminum, stainless or other high nickel steels, copper, brass and the like.

The tanks will be fitted with the conventional connections, such as inlet pipes 30 for the introduction of the liquid, outlet pipes 32 for the removal of the liquid, relief valves 34 for the release of vapors for the avoidance of the build-up of excessive pressures, and other gauges for control of fluid flow, fluid level, and pressures within the tank. Usually these fittings will extend into the tank through a trunk 36 at the top which projects upwardly beyond the tank from about the central portion of the tank through aligned openings 38 provided in the intake of the ship to permit access to the attachments from above deck.

Having briefly set forth the basic constructions, detailed description will now be made of the means for positioning the tank or tanks within the insulated hold space without direct attachment of the tank or tanks to the ship structure whereby the tank remains free for movement relative to the ship structure responsive to expansion and contraction due to temperature change, yet the tank is stabilized in a predetermined position within the insulated hold space to militate against uncontrolled movements relative to the ship structure in response to either such expansion or contraction or in response to the pitching and rolling movements of the ship.

In my copending application Serial No. 96,120, filed March 16, 1961, and entitled "Stabilization Means for Storage Tanks," description is made of a key and keyway construction for bottom stabilization of the tank to militate against inadvertent displacement from a stabilized position. In many instances, where substantial area of contact is available between the bottom wall of the tank and the surface upon which it is supported, stabilization means at the bottom is of less significance by reason of the frictional forces available to resist relative movement. However, the upper end portion of the tank is subject to relative movements not only by reason of expansions and contractions in the crosswise direction but expansions and contractions in the vertical direction which will increase or decrease the height of the tank. Still further, the upper end portion of the tank is laterally unsupported which leads to rocking movements of the tank on its support by reason of the pitching and rolling movements of the ship whereby the upper end portion of the tank is exposed to jarring impacts with the ship structure in the absence of continuous stabilization of the position of the tank.

Various techniques have been proposed for stabilization of the upper end portion of the tank to enable freedom for relative movement of the tank in expansion or contraction, while at the same time controlling the upper end portion of the tank against movement from a stabilized position. In one instance described in the issued patent of Farrell et al. No. 2,954,003, use is made of a plurality of flexible cables which extend angularly in various directions to interconnect the ship structure with remote sections of the top of the tank for enabling increase or decrease in the height of the tank without noticeable increase or decrease in the distance between the pivotal connections of the cables at their ends to the ship structure and the tank top. In another system described in the copending application of Henry, Ser. No. 716,305, filed February 20, 1958, entitled "Tank and Support Combination for the Storage of Cold Materials," use is made of the trunk portion which extends through the deck of the ship as a key which is operative within a keyway for stabilization. While the described techniques provide for considerable degree of stabilization, these prior methods involve absorbing the restraining forces in a rather localized area, and the present invention is designed to distribute the restraining forces over the entire length of the tank.

In accordance with the practice of this invention, stabilization at the top is achieved by restraining forces operative substantially throughout the entire length of the tank to engage the top of the tank in such a manner as to continuously restrain the tank against uncontrolled relative movements while still permitting freedom for such relative movement as is required in thermal expansion and contraction.

Figure 3:
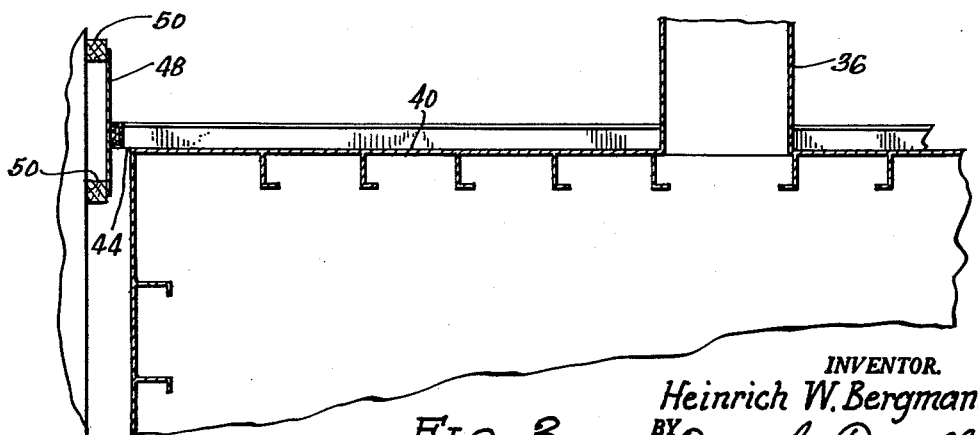
FIG. 3 is an enlarged sectional elevational view illustrating the stabilization means for the upper portion of the tank.
Figure 4:
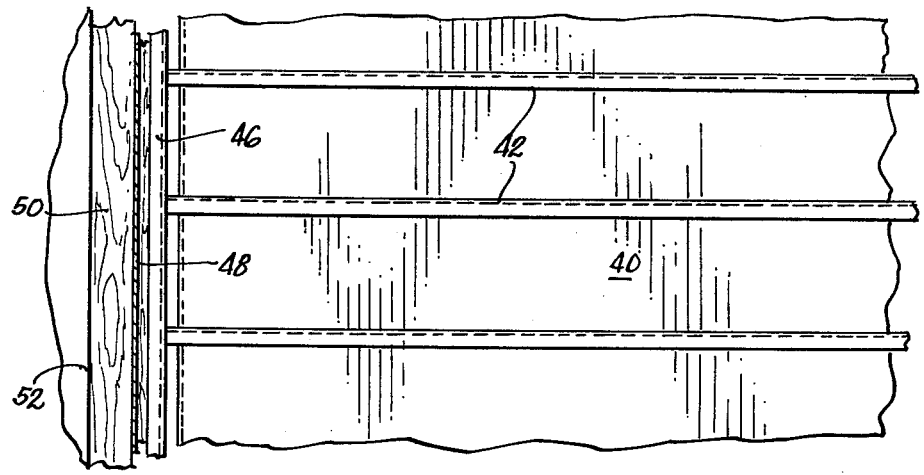
FIG. 4 is a top plan view of the elements shown in FIG. 3.
Figure 5:
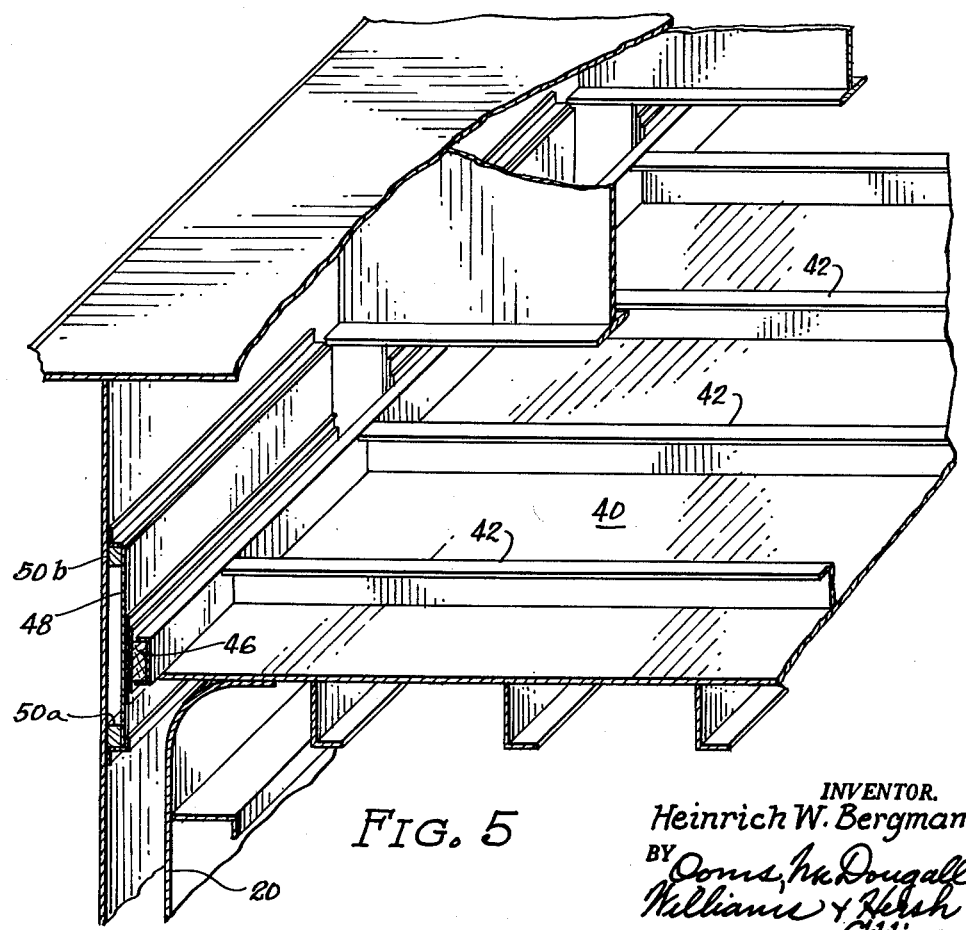
FIG. 5 is a perspective view partially in section of a corner portion of the tank and its stabilization means.

Referring now to FIGS. 3 and 4, the top wall 40 of the tank is provided with a plurality of longitudinally spaced apart, crosswise extending girders 42 or other rigid strengthening and stiffening members which reinforce the top wall of the tank and extend laterally for a short distance beyond the lateral edges of the tank to provide an overhang 44. An elongated shoe 46, such as a metal channel containing a buffer, such as a wooden strip, is fixed to the overhanging edges of the crosswise extending members 42 for sliding engagement on the inner surfaces of endwise aligned, vertically disposed resilient guide plates 48 mounted at their upper and lower edge portions upon insulating strips 50 secured in the desired vertically spaced apart relationship to the corresponding portions of the ship structure, identified by the numeral 52 which may constitute or include the insulating lining 52 defining the insulated space. The guide shoe 46 is adapted resiliently to engage the inner face of the guide plate 48 in an area between the vertically spaced apart supports 50 for resilient engagement for reasons which will hereinafter be pointed out.

Increase or decrease in the height of the tank due to expansions or contractions in response to temperature change will present no serious problem in a construction of the type described since the shoe 46 is free to slide vertically over the surface of the guide plate 48 so as continuously to remain in engagement therewith for stabilization, it being only necessary that the guide plate 48 be positioned and that it be dimensioned to have a height between the supports 50 which is at least as great as the amount of vertical displacement calculated to take place between the position of the shoe upon expansion or upon contraction of the tank due to temperature change.

The problem in this type of construction arises from the contraction of the tank in the crosswise direction whereby the shoe would become spaced from the guide plate. In an aluminum tank having a width of 60 feet, for example, contraction of approximately 2½ inches may take place when the tank is reduced in temperature from about 80° F. to about −250° F., when filled with liquefied natural gas. This would leave an undesirable gap of about 1¼ inches on each side if a fitting relationship were established as a prerequisite upon installation. Thus, it is an important concept of this invention to achieve a prestressed relationship between the guide elements upon installation whereby the formation of a gap of the type described between the elements can be avoided when the tank is filled with the cold liquid cargo.

For this purpose, the guide plate 48 is installed, as illustrated in FIGURE 6, by positioning the lower edge 54 of the guide plate on a bracket 56 previously attached to the side wall of the ship structure with the wooden support block 50ª in between so that the lower edge of the plate 54 is received between the block 50ª and the upwardly extending ledge 58 of the bracket 56. With the upper portions of the guide plate leaning against the adjacent wall forming part of the ship structure, the tank 20 can be lowered into position on its support with the shoe members 46 on the ends of the top braces 42 in crosswise alignment with the relaxed guide plate, as illustrated in FIGURE 4. It will be seen that the edges of the shoes actually project beyond the face that would be assumed by the guide plate when vertically positioned on its support so that the guide plate will be flexed inwardly by the shoes when the guide plates are displaced to their normal assembled relationship. The amount that the shoes extend beyond the ends of the guide plates, when in normal position, is adapted to correspond to the amount of displacement calculated to take place at the lateral edges of the tank upon contraction of the tank so that the shoe 46 will remain in surface contact with the guide plate when the tank is subsequently loaded with the cold liquefied gas.

With the tank thus mounted in position of use on its support, the upper end portions 60 of the guide plates are flexed inwardly to normal position to space the upper end portions from the supporting walls, as illustrated in FIGS. 3 and 9. The amount of displacement is adapted to correspond to the spaced relationship at the lower end 54 vertically to align the upper and lower edges but with the portion in between flexed outwardly by the shoe. The amount of inward displacement at the upper end portion can be greater than at the lower end portion to provide for a greater spaced relationship with the support, especially where a greater amount of contraction is found to take place in the upper end portion of the tank.

The desired flexure of the guide plates for displacement of the upper end portions from the adjacent walls can be effected by various means. In FIGS. 7 and 8, illustration is made of one means comprising cooperating pairs of tie rods 62 and 64 extending crosswise between the upper edges of the guide plates to stringers 66 and 68 respectively with a jack 70 mounted between the stringers to effect displacement of the stringers 66 and 68 in the direction away from each other. This will operate through the longitudinally spaced apart pairs of cross-wise extending tie rods 62 and 64 to flex the upper free end portions of the guide plates inwardly until the desired spaced relationship exists, as illustrated in FIG. 8. Thereafter the upper wooden spacer member 50ᵇ is inserted between the flexed edge portion of the guide plates and the adjacent wall to hold the edge portion of the guide plates in the desired position of use with the center portion bowed outwardly between the vertically spaced apart supports by the shoes 46 on the opposite ends of the top brace members 42. The tie rods 62 and 64 and the back members 70 for flexing the plates can be removed once the plates and the supports have been installed.

When the tank is substantially reduced in temperature upon being filled with cold liquid, the amount of contraction taking place will cause displacement of the shoes inwardly to relieve the bowed portion until the guide plate extends substantially vertically along the side wall but with the shoes still continuously in engagement with the inner surface thereof.

The elastic reformation of the guide plate is controlled in part by the spacing between its supports and in part also by the thickness, number and character of the metal plates making up the guide plate. Such plates and supports can be dimensioned to correspond with the length of the tank when no interferences or limitations as to a spaced relationship exist or they can be constructed of one or more shorter sections to clear deck girders or other portions of the ship structure.

In the illustrated modification, the supports 50ª and 50ᵇ constitute wooden panels or blocks which are capable of dampening noise and impacts as well as insulating the plates from the supporting structure. The guide plates can be formed of but a single plate or a plurality of plates laminated one to the other, as illustrated in the drawings.

It is preferred to embody the described stabilzation means alongside the lateral edges of the tank and on opposite sides to nullify the more disturbing forces occasioned by the rolling movements of the ship. For stabilization in the lengthwise direction, such as for the purpose of counteracting the pitching movements of the ship or other conveyance means, it will be apparent that stabilization means of the type described can also be embodied alongside the forward and rearward edges of the upper end portion of the tank.

It will be apparent from the foregoing that the stabilization means is flexible in its construction and arrangement since the amount of resilient deflection in the operative connection between the guide plate and the shoe can be increased or decreased even after installation by increase or decrease respectively in the spaced relationship of the upper edge portion of the guide plate to meet existing conditions. Thus a resilient engagement can be established or re-established, as the case may be, in the event of change of materials or temperatures involved.

It will be apparent also that the described guiding relationship can be achieved even with tanks other than of rectangular shape since it would only be necessary for the girders to extend outwardly beyond the upper edge of the tank to a uniform lengthwise alignment to provide aligned edge portions upon which the elongate guide shoes can be mounted.

It will be understood that changes may be made in the details of construction, arrangement and operation without departing from the spirit of the invention, especially as defined in the following claims.

I claim:

1. In a tank of large capacity having front, back, side, top and bottom walls adapted to be mounted within a supporting structure, means for stabilizing the position of the tank within the supporting structure while the tank remains free for movement due to thermal expansion and contraction comprising guide shoes rigid with the tank and extending horizontally beyond the top wall thereof, resilient vertically disposed guide plates having the central portions thereof aligned endwise with the guide shoes, means supporting the vertically disposed guide plates at their upper and lower edges on the supporting structure with the supporting means spaced above and below the portion aligned with the guide shoes whereby the guide shoes normally engage the portion of the guide plates intermediate the supports, said guide shoes extending outwardly normally beyond the supported edges of the guide plates by an amount at least as great as the amount of displacement calculated to take place in the corresponding edge portion of the tank in response to contraction whereby the guide shoe normally remains in resilient engagement with the face of the guide plate throughout the assembled relation and use.

2. A tank structure as claimed in claim 1 in which the guide shoes and guide plates are arranged alongside the lateral edges of the tank.

3. A tank structure as claimed in claim 1 in which the guide shoes comprise elongated metal members lined with a buffer material connected to the upper edge portions of the tank and positioned to extend as an overhang beyond the edge portions.

4. A tank structure as claimed in claim 1 in which the guide plates comprise resilient metal plates.

5. A tank structure as claimed in claim 1 in which the means supporting the guide plates on the supporting structure comprise wooden blocks disposed between the upper and lower edge portions of the plates between the sides of the plates opposite the surface engaged by the guide shoe and the supporting structure.

6. A tank structure as claimed in claim 1 in which the guide plates are bowed outwardly by the guide shoe when the tank is at ambient temperature.

7. A tank structure as claimed in claim 1 which includes metal stiffening and reinforcing members secured to the top wall of the tank in longitudinally spaced apart relationship and dimensioned to have a length greater than the width of the tank to extend beyond the lateral edges of the tank and in which the guide shoes are mounted on the overhanging end portions of said stiffening members.

References Cited in the file of this patent

UNITED STATES PATENTS

| 2,229,081 | Hansen et al. | Jan. 21, 1941 |
| 2,925,934 | Hampton et al. | Feb. 23, 1960 |
| 2,954,003 | Farrell et al. | Sept. 27, 1960 |
| 2,992,622 | Maker | July 18, 1961 |